United States Patent
Eslambolchi et al.

(10) Patent No.: US 6,363,051 B1
(45) Date of Patent: Mar. 26, 2002

(54) METHOD AND APPARATUS FOR ACHIEVING FAST RECONNECTION OF PERMANENT VIRTAL CHANNELS IN A FRAME RELAY NETWORK

(75) Inventors: Hossein Eslambolchi, Basking Ridge; Clayton M. Lockhart, Red Bank, both of NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/107,984

(22) Filed: Jun. 30, 1998

(51) Int. Cl.$^7$ .......................... H04L 1/00; H04L 12/423
(52) U.S. Cl. .................. 370/225; 370/244; 370/449
(58) Field of Search ........................ 370/216, 217, 370/218, 219, 220, 221, 222, 223, 224, 225, 226, 227, 228, 241, 242, 244, 245, 247, 248, 250, 395, 396, 397, 398, 399, 409, 410, 449

(56) References Cited

U.S. PATENT DOCUMENTS

| | | | | |
|---|---|---|---|---|
| 5,539,734 A | * | 7/1996 | Burwell et al. ............. | 370/410 |
| 5,710,885 A | * | 1/1998 | Bondi ......................... | 709/224 |
| 5,831,970 A | * | 11/1998 | Arao .......................... | 370/227 |
| 5,917,823 A | * | 6/1999 | Benning et al. ............ | 370/397 |
| 5,974,046 A | * | 10/1999 | Kim et al. .................. | 370/395 |
| 5,995,608 A | * | 11/1999 | Detampel, Jr. et al. ..... | 379/205 |
| 6,038,219 A | * | 3/2000 | Mawhinney et al. ........ | 370/242 |
| 6,055,239 A | * | 4/2000 | Kato .......................... | 370/409 |

* cited by examiner

Primary Examiner—Kwang B. Yao

(57) ABSTRACT

Rapid reestablishment of permanent virtual circuits (PVCs $15_1$–$15_6$) between frame relay switches $12_1$–$12_4$ in a frame relay (10) is accomplished by periodically polling the switches by a configuration controller (18) via an out-of-band connection to obtain PVC information from the switches. Should a fault occur, the fault is isolated and mitigated. Thereafter, the configuration controller (18) downloads the stored PVC information to the switches in parallel via the out-of-band connection to enable the switches to re-establish the PVCs quickly, rather than wait to do so via an in-band connection.

3 Claims, 1 Drawing Sheet

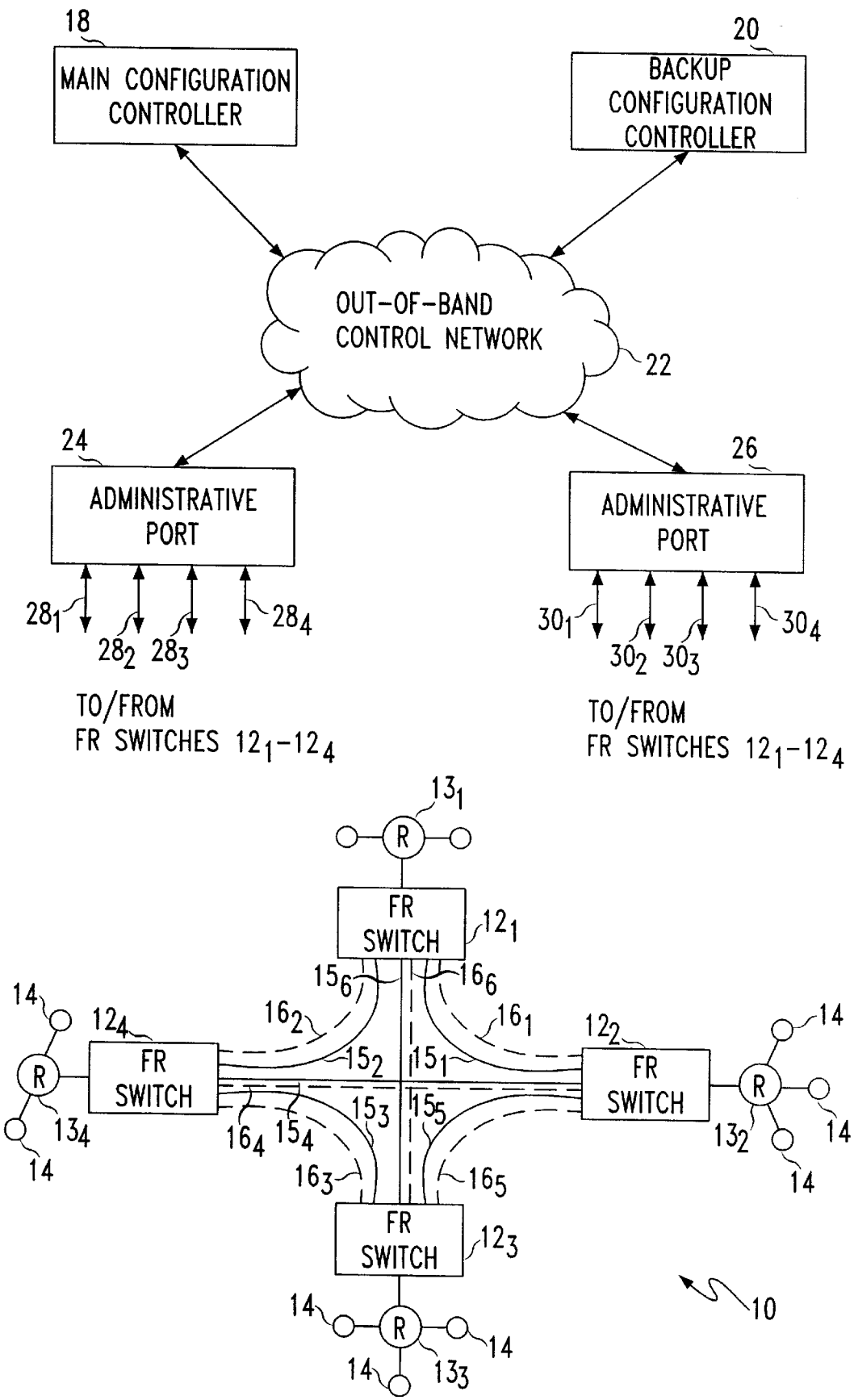

METHOD AND APPARATUS FOR ACHIEVING FAST RECONNECTION OF PERMANENT VIRTAL CHANNELS IN A FRAME RELAY NETWORK

TECHNICAL FIELD

This invention relates to a technique for re-establishing permanent virtual circuits in a frame relay network in a rapid and efficient manner following a service outage.

BACKGROUND ART

Presently, several inter-exchange telecommunications carriers, such as AT&T, offer frame relay service for transporting data packets from one local area network to another. Among the customers that utilize frame relay service from AT&T and other telecommunications carriers are banks and financial institutions that transport data from automated teller machines and point of service terminals to data processing facilities to enable debiting of a purchaser's account for cash withdrawals and debit-card purchasers. Other customers of frame relay service include manufacturers that use the service to transmit data among manufacturing facilities to coordinate scheduling, inventory levels, and other activities. Large retailers who maintain geographically separated stores and warehouses also use frame relay service to exchange data between facilities to assure timely delivery of merchandise.

The heavy reliance of customers on such frame relay service mandates that the carriers that offer such service provide fast restoration in the event of a service outage. Unfortunately, present day techniques for restoring service often take a significant amount of time, especially for very large networks. Invariably, in the event of a service outage, all of the Permanent Virtual Circuits (PVCs) that link frame relay switches become disabled, and must be re-established after isolation and repair of the fault. Reconnection of the PVCs requires re-establishment of logical (control) signaling links among the frame relay switches first before the frame relay switches can re-establish the PVCs themselves. During normal operation of a frame relay network, establishing such logical signaling links takes little time. However, in the event of a large service outage, a significant amount of activity often exists in the network, significantly lengthening the time required to re-establish the PVCs among the frame relay switches. As a consequence, customers incur delayed restoration of service, increasing customer dissatisfaction and reducing revenue to the carrier providing such service.

Thus, there is a need for a technique that reduces the time required to re-establish PVCs in a frame relay network following a service outage.

BRIEF SUMMARY OF THE INVENTION

Briefly in accordance with a preferred embodiment of the invention, a method is provided for restoring Permanent Virtual Circuits (PVCs) that link frame relay switches in a frame relay network following a fault. Prior to the fault, a main configuration controller periodically polls each of the switches in the frame relay network to obtain information about the PVCs linking the switches. Such polling is done out-of band from the frame relay network, either via a dedicated IP control network, or via dial-up links of a Public Switched Telephone Network. The main configuration controller stores the information obtained during each polling by over-writing the information obtained during the previous polling. Following isolation and mitigation of a fault in the frame relay network, the main configuration downloads to each switch, via the out-of-band network, the stored PVC information to enable the frame relay switches to the switches to reestablish the PVCs quickly.

BRIEF DESCRIPTION OF THE DRAWING

FIG. 1 shows a block schematic diagram of a frame relay network in accordance with a preferred embodiment of the invention.

DETAILED DESCRIPTION

FIG. 1 illustrates a frame relay network 10 in accordance with a preferred embodiment of the invention. The network 10 includes a plurality of frame relay (FR) switches, such as the switches $12_1$–$12_4$. While the network 10 of the preferred embodiment includes the four switches, the network 10 could include a larger or smaller number of switches as required. The switches $12_1$–$12_4$ each receive packet data from a corresponding one eof routers $13_1$–$13_4$ that each serve one or more data source/destinations 14—14. The frame relay switches $12_1$–$12_4$ are linked to each other via permanent virtual circuits (PVCs) $15_1$–$15_6$ in the manner shown in FIG. 1. The PVCs circuits $15_1$–$15_6$ are akin to leased or private lines in a conventional Public Switched telephone network in that the PVCs do not require reestablishment for every subsequent transmission of data between a pair of frame relay switches. During normal operation, the frame relay switches $12_1$–$12_4$ each store information regarding the PVCs $15_1$–$15_6$, especially those originating at that switch within an image table (not shown). The image table information enables to switch to know what PVC's exist for that switch, thus enabling the switch to send data without first having to establish a PVC for transmission.

In the event of a network outage, one or more of the PVCs may become inoperative. Indeed, a large service outage may affect all or a majority the PVCs $15_1$–$15_6$. At the present time, reestablishment of the PVCs $15_1$–$15_6$ may consume significant time, especially following a large service outage. To re-establish the PVCs $15_1$–$15_5$, the frame relay switches $12_1$–$12_4$ must first reestablish signaling links $16_1$–$16_6$, (shown by dashed lines), whereupon the frame relay switches thereafter proceed to set up the PVCs $15_1$–$15_6$. While the time required to set up the PVCs $15_1$–$15_6$ during normal operation is generally minor, after a major service outage, an extraordinary amount of activity typically exists on the frame relay network, significantly lengthening the time required to reestablish the PVCs.

In accordance with the invention, the time required to set up the PVCs' $15_1$–$15_6$ can be reduced by communicating PVC information to the frame relay switches $12_1$–$12_4$ out of band, i.e., via a channel that is separate and distinct than the PVCs $15_1$–$15_6$ and the control channels $16_1$–$16_6$. To accomplish such out-of-band communication of PVC information, the network 10 of the invention includes a main configuration controller 18, and preferably, a back-up configuration controller 20. A control network 22 that is out-of-band with respect to the PVCs $15_1$–$15_6$ and the signaling links $16_1$–$16_6$ couples the main and back-up configuration controllers 18 and 20, respectively, to a main administration port 24, and preferably, a back-up administration port 26 as well. The control network 22 may comprise a dedicated data network, such as a network that uses an IP protocol. Alternatively, the network 22 could comprise a Public Switched Telephone Network (PSTN), such as the PSTN maintained by AT&T. When the network 22 comprises a PSTN, the connections between the PSTN and the main and back-up configuration controllers 18 and 20, respectively, and the main and back-up administrative ports 24 and 26, respectively, may comprise dedicated lines or dial-up links. The main administrative port 24 has connections $28_1$–$28_4$ to the frame relay switches $12_1$–$12_4$, respectively, whereas each of the connections $30_1$–$30_4$ links a corresponding one of the frame relay switches to the back-up administrative port 26. Each of the connections $28_1$–$28_4$ and $30_1$–$30_4$ typically has a T3 bandwidth and serves to communicate PVC information between each switch and a corresponding one of the main and back-up administration ports 224 and 26.

In operation, the main controller 18 periodically polls each of the frame relay switches $12_1$–$12_4$ via the main administrative port 24 (or in the event of its failure, via the back-up administrative port 26) to obtain information regarding the cross connects, that is the PVCs $15_1$–$15_6$, that exist between switches. Depending on the size of the frame relay network, and the frequency at which PVC changes occur, the main configuration controller 18 may poll the switches as often as every hour, or as infrequently as once each day. The main configuration controller 18 obtains the PVC information from the frame relay switches $12_1$–$12_4$ out-of-band, that is separate from the PVCs $15_1$–$15_6$ and the control links $16_1$–$16_6$, by making use of the out-of- band control network 22. The main configuration controller 18 stores the PVC information obtained during each subsequent polling by overwriting the information obtained during the last previous polling. As the main configuration controller 18 stores the most recently obtained polling information, main configuration controller provides the information to the back-up configuration controller 20 via the network 22. In this way, the PVC information stored at the back-up configuration controller 20 mirrors the PVC information stored at the main configuration controller 18.

Should the frame relay network 10 suffer a fault, those responsible for maintaining the network will to isolate and mitigate the fault. After fault isolation and mitigation, the main configuration controller 18 (or in the event of its failure, the back-up configuration controller 20) downloads to each of the frame relay switches $12_1$–$12_4$ the PVC information for that switch based on the last polling. In practice, the main configuration controller 18 downloads the PVC information to the frame relay switches $12_1$–$12_4$ in parallel, thus enabling the switches to receive the information quickly, and thereafter commence restoration of the PVC, rather than wait to communicate the information among themselves in-band, as occurred in the prior art. The receipt of the PVC information from the main configuration controller 18 (or in the event of its failure, from the back-up configuration controller 20) out-of-band thus enables the frame relay switches to re-establish the PVCs $15_1$–$15_6$ more quickly, reducing the interval of customer outage, and the accompanying customer dissatisfaction.

In practice, the PVC information downloaded from the main configuration controller 18 may not reflect the latest cross-connection information at the frame relay switch, especially if new cross-connects have been added since the last polling. We assume the frame relay switches $12_1$–$12_4$ have the capability of comparing the downloaded PVC information from the main configuration controller 18 to the PVC information stored by the switch in its image table. Assuming that the switches also have the ability of reconnecting/disconnecting its PVCs, then each switch can advantageously make the comparison between the downloaded PVC information, and the PVC information in its image table, and thereafter make the necessary re-connections/disconnections in accordance with the comparison.

The foregoing describes a technique for establishing rapid reconnection of permanent virtual circuits in a frame relay network.

It is to be understood that the above-described embodiments are merely illustrative of the principles of the invention. Various modifications and changes may be made thereto by those skilled in the art which will embody the principles of the invention and fall within the spirit and scope thereof.

What is claimed is:

1. A method for restoring Permanent Virtual Circuits (PVCs) linking frame relay switches in a frame relay network following isolation and mitigation of a fault, comprising the steps of:

prior to the occurrence of the fault, periodically polling each of the frame relay switches by a main configuration controller via an out-of-band connection separate from the PVCs and from signaling links between the frame relay switches to obtain information about cross-connects between the frame relay switches and to collect information from each switch regarding its PVCs;

storing at the main configuration controller the PVC information for each switch obtained from each polling operation to overwrite the stored PVC information obtained from a previous polling operation;

following isolation and mitigation of a fault, downloading the stored polling information from the main configuration controller to each corresponding frame relay switch via the out-of-band connection to cause each switch to reconnect the PVCs in accordance with the downloaded PVC information;

storing at each switch prior to the occurrence of a fault, an image table indicative of the PVCs originating at said switch;

following receipt of the downloaded PVC information received at said switch, comparing the PVCs indicated by said downloaded information to the PVCs indicated by said image table; and effecting a change in any PVC specified in said image table that differs from said downloaded information.

2. A frame relay network, comprising:

a plurality of frame relay switches linked to each other via Permanent Virtual Circuits (PVCs) and signaling links;

a main administrative port coupled to the frame relay switches;

a main configuration controller for (a) periodically polling each of the frame relay switches to obtain information about cross-connects between the frame relay switches and to collect information from each switch regarding its PVCs, (b) storing the PVC information for each switch obtained from each polling operation to overwrite stored PVC information obtained from a previous polling operation, and (c) downloading the stored polling information to each corresponding frame relay switch following isolation and mitigation of a fault to cause each switch to reconnect the PVCs in accordance with the downloaded PVC information;

a control network for providing an out-of-band link separate from the PVCs and the signaling links and the frame relay switches between the main configuration controller and the main administrative port with respect to the PVCs linking the frame relay switches;

a backup configuration controller for receiving from the main configuration controller the stored polling information and for downloading the stored polling information to each corresponding frame relay switch following isolation and mitigation of a fault to cause each switch to reconnect the PVCs in accordance with the downloaded PVC information upon a failure of the main configuration controller.

3. A method for restoring Permanent Virtual Circuits (PVCs) linking frame relay switches in a frame relay network following isolation and mitigation of a fault, comprising the steps of:

prior to the occurrence of the fault, periodically polling each of the frame relay switches by a main configuration controller via an out-of-band connection separate from the PVCs and from signaling links between the frame relay switches to obtain information about cross-connects between the frame relay switches and to collect information from each switch regarding its PVCs;

storing at the main configuration controller the PVC information for each switch obtained from each polling operation to overwrite the stored PVC information obtained from a previous polling operation;

following isolation and mitigation of a fault, downloading the stored polling information from the main configuration controller to each corresponding frame relay switch via the out-of-band connection to cause each switch to reconnect the PVCs in accordance with the downloaded PVC information; and storing, at a back-up configuration controller the PVC information obtained by polling each switch; and downloading from the back-up configuration controller to each switch the stored PVC information in the event of a failure of the main configuration controller.

* * * * *

UNITED STATES PATENT AND TRADEMARK OFFICE
CERTIFICATE OF CORRECTION

PATENT NO.   : 6,363,051 B1                                                           Page 1 of 1
DATED        : March 26, 2002
INVENTOR(S)  : Hossein Eslambolchi and Clayton M. Lockhart It is certified that error appears in the above-identified patent and that said Letters Patent is hereby corrected as shown below:

<u>Title page,</u>
Item [54], the title reads "METHOD AND APPARATUS FOR ACHIEVING FAST RECONNECTION OF PERMANENT VIRTAL CHANNELS IN A FRAME RELAY NETWORK" should be "METHOD AND APPARATUS FOR ACHIEVING FAST RECONNECTION OF PERMANENT VIRTUAL CHANNELS IN A FRAME RELAY NETWORK --

Signed and Sealed this

Eleventh Day of June, 2002

*Attest:*

*Attesting Officer*

JAMES E. ROGAN
*Director of the United States Patent and Trademark Office*